United States Patent
Lydan

(12) 
(10) Patent No.: US 6,916,145 B2
(45) Date of Patent: Jul. 12, 2005

(54) DUAL DUROMETER CLIP

(75) Inventor: Robert Lydan, Cambridge (CA)

(73) Assignee: Decoma Exterior Trim, Inc., Concord (CA)

( * ) Notice: Subject to any disclaimer, the term of this patent is extended or adjusted under 35 U.S.C. 154(b) by 74 days.

(21) Appl. No.: 10/333,196

(22) PCT Filed: Jul. 13, 2001

(86) PCT No.: PCT/CA01/01020

§ 371 (c)(1),
(2), (4) Date: Jan. 16, 2003

(87) PCT Pub. No.: WO02/06682

PCT Pub. Date: Jan. 24, 2002

(65) Prior Publication Data

US 2003/0180115 A1 Sep. 25, 2003

Related U.S. Application Data

(60) Provisional application No. 60/218,598, filed on Jul. 17, 2000.

(51) Int. Cl.$^7$ ................................................ F16B 19/00
(52) U.S. Cl. ...................... 411/510; 411/508; 425/577; 249/63
(58) Field of Search ........................... 24/297; 411/369, 411/508, 509, 510, 542, 913; 425/577; 249/63, 98, 99

(56) References Cited

U.S. PATENT DOCUMENTS

| | | | |
|---|---|---|---|
| 3,810,279 A | | 5/1974 | Swick et al. |
| 4,216,697 A | * | 8/1980 | Wilson ......................... 411/15 |
| 5,173,026 A | * | 12/1992 | Cordola et al. ............. 411/508 |
| 5,704,753 A | * | 1/1998 | Ueno ......................... 411/509 |
| 5,797,714 A | * | 8/1998 | Oddenino ............... 411/509 X |
| 5,857,244 A | * | 1/1999 | Edwards et al. ............... 24/297 |
| 6,305,055 B1 | * | 10/2001 | Castro .................... 411/509 X |

OTHER PUBLICATIONS

Patent Abstracts of Japan, Publication No. 01110919/Publication Date Apr. 27, 1989 Application Date Oct. 24, 1987; Application No. 62269050 Applicant: Toyoda Gosei Co Ltd; Inventor: Omori Norio Title: Manufacture of Clip with Cap.

* cited by examiner

*Primary Examiner*—William L. Miller
(74) *Attorney, Agent, or Firm*—Clark Hill PLC

(57) ABSTRACT

A clip (10) for fastening a panel (50) to a support structure (52) is provided. The clip (10) has a plate (12) and a stem (14) extending from the plate. The stem 14 has a base (22) and a body section (24). The base (22) has a width greater than a width of the body section (24). A pair of tangs (16) extend from a distal end of the stem (14) toward the plate (12). A sealing flange (18) extends from the base (22). The sealing flange (18) is first molded from a material having a first durometer and then the plate (12), stem (14) and tangs (16) are molded from a material having a second durometer greater than the first durometer.

5 Claims, 2 Drawing Sheets

DUAL DUROMETER CLIP

RELATED APPLICATION

This application claims priority to and all the benefits of U.S. Provisional Application No. 60/218,598, filed on Jul. 17, 2000.

FIELD OF INVENTION

This invention relates to a dual durometer clip. In particular, this invention relates to a fastener having a flange of softer material for sealing the fastener against a mounting surface.

BACKGROUND OF INVENTION

W-Clips are well know in the automotive industry to attach a cladding or panel to a support structure. W-Clips generally have a base plate with a stem extending therefrom. A pair of elastic tangs extend from the tip of the stem towards the base plate. A sealing flange is spaced from the base plate and extends about the base of the stem. The sealing flanges closes the aperture on the support structure. Examples of such clips are illustrated in U.S. Pat. Nos. 5,173,026; 6,689,863; 5,704,753; and 5,857,244.

The prior art W-Clips can be made as a single injection molding. Since the stem and base plate of the W-clip needs to be relatively rigid to provide sufficient support for the cladding or panel, the sealing flange will also be relatively rigid and thus provides only a limited amount of sealing.

Alternatively, the prior art W-Clips can be manufactured using an over-molding technique. The base plate and stem are first molded using a relatively rigid material and then a softer material is over molded to form the sealing flange.

Typically, the base of the stem has the same width as the rest of the stem. If a softer flange is over-molded onto the base of the stem, the slip could be inserted beyond the flange causing the flange to distort and reduce its effectiveness as a seal.

Alternatively, a more rigid flange could be initially molded and a softer material over-molded at the outer periphery of the flange. The more rigid flange prevents the clip from being over-inserted. However, the complexity and cost of the mold required to produce such a clip increases dramatically.

Thus, there exist a need for a simple W-clip which provides an effective sealing flange, which-cannot be over-installed and which is easily molded.

SUMMARY OF INVENTION

The disadvantages of the prior art may be overcome by providing a clip having a stem with a base which is wider than the body of the stem. A sealing flange is first molded and then the body of the stem and base plate is under-molded.

According to one aspect of the invention, there is provided a clip for fastening a panel to a support structure. The clip has a plate and a stem extending from the plate. The stem has a base and a body section. The base has a width greater than a width of the body section. A pair of tangs extends from a distal end of the stem towards the plate. A sealing flange extends from the base of the stem. The sealing flange is first molded from a material having a first durometer and then the plate, stem and tangs are molded from a material having a second durometer greater than the first durometer.

According to another aspect of the invention, there is provided a method of forming a clip. The method includes the steps of:

providing a mold having a cavity complementary to the clip;

moving an injector pin to close off a portion of the cavity complementary to the stem;

moving a sleeve surrounding the injector pin to a position to close a portion of the cavity defining the sealing flange;

injecting a first material having a first durometer into the cavity to mold the sealing flange;

retracting the injector pin and the sleeve to close the cavity at a position to define a portion of the plate;

injecting a second material having a second durometer greater than the first durometer into the cavity to mold the plate, stem and tangs; and opening the mold and ejecting the clip.

According to another aspect of the invention, there is provided an apparatus for molding a clip according to the present invention. The apparatus has a mold having a first mold cavity complementary to the sealing flange and a second mold cavity complementary to said plate, stem and tangs. An injector pin communicates with the first and second mold cavity and a source of first material of a first durometer and a source of second material of a second durometer. The second durometer is greater than the first durometer. A sleeve surrounds the injector pin and slides relative thereto. The pin and sleeve each move independently between a first position closing the first mold cavity and a second position closing the second cavity. The pin closes a portion of the second cavity corresponding to the stem and tangs when the pin is in the first position.

DESCRIPTION OF THE DRAWINGS

In drawings which illustrate the preferred embodiment of the invention.

DESCRIPTION OF THE INVENTION

Figure 1:
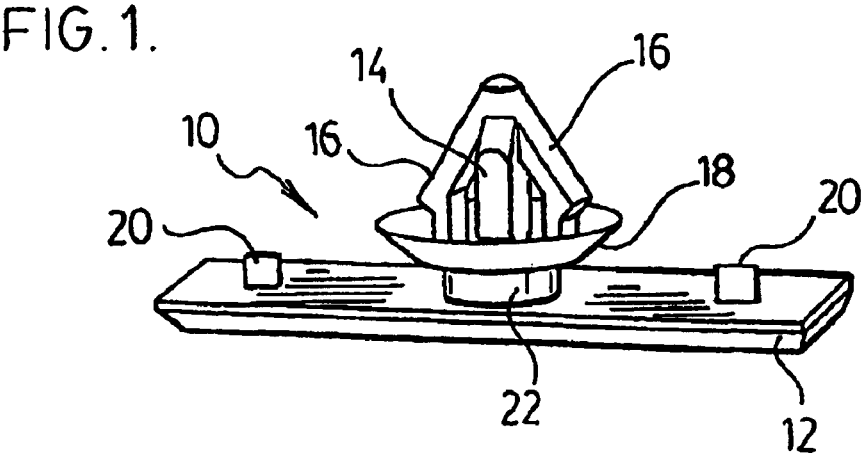
FIG. 1 is a perspective view of the W-Clip of the present invention.
Figure 2:
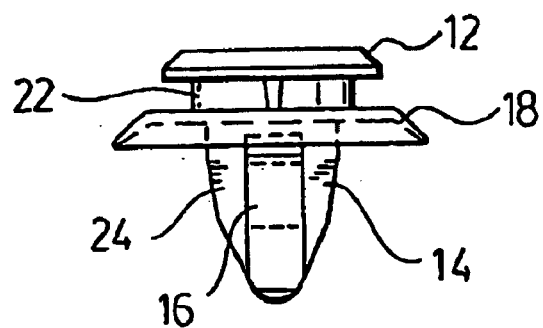
FIG. 2 is an end elevational view of the W-Clip of FIG. 1.
Figure 3:
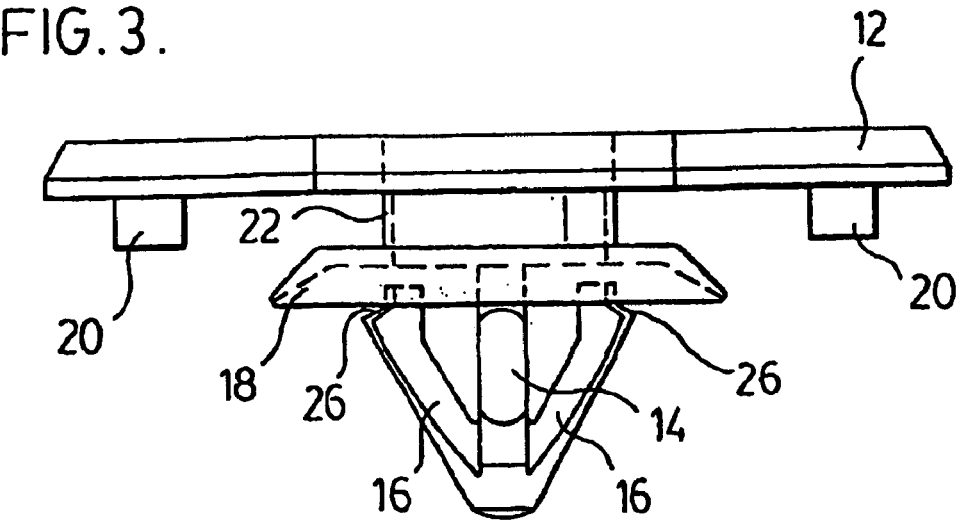
FIG. 3 is a side elevational view of the W-Clip of FIG. 1.

Referring to FIGS. 1–3, a W-Clip 10 of the present invention. The clip 10 generally comprises a plate 12, a stem 14, a pair of tangs 16 and a sealing flange 18.

Plate 12 is illustrated as rectangular with tabs 20 extending from opposite end regions of the plate 12. Size and shaping of the plate 12 and the position and size of the tabs 20 are dictated by the particular application of the clip 10.

Stem 14 extends generally perpendicularly from the plate 12. Stem 14 has a base 22 and a body section 24. As is apparent in FIG. 2, the base 22 has a greater width than the body section 24. Base 22 has a thickness slightly greater than the thickness of the plate 12. Body section 24 preferably has a tapered end.

A pair of resilient tangs 16 extend from the tapered end of the body section 24 towards the plate 12. The tangs 16 each have a notch 26 at the distal ends thereof. The notches 26 align with the base section 24 of the stem 14.

Sealing flange 18 extends radially outwardly from the base 22. The sealing flange 18 presents a concave seal.

Figure 4:
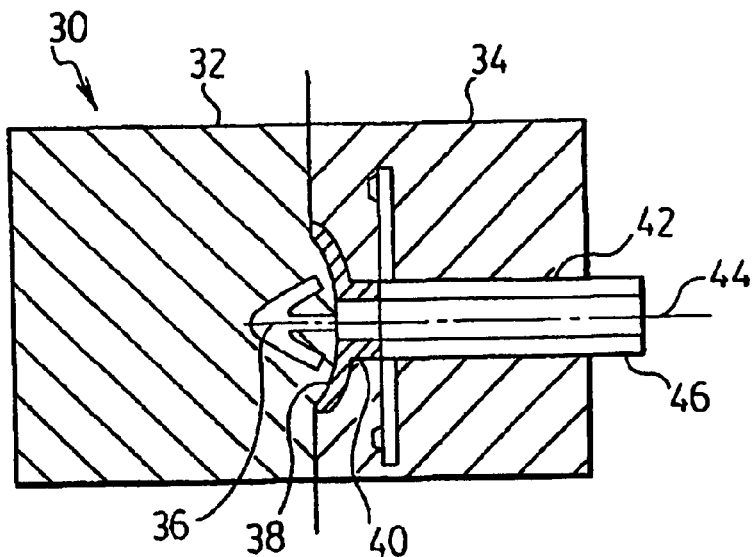
FIG. 4 is a sectional view of a mold for molding the W-Clip of FIG. 1, molding the sealing flange.
Figure 5:
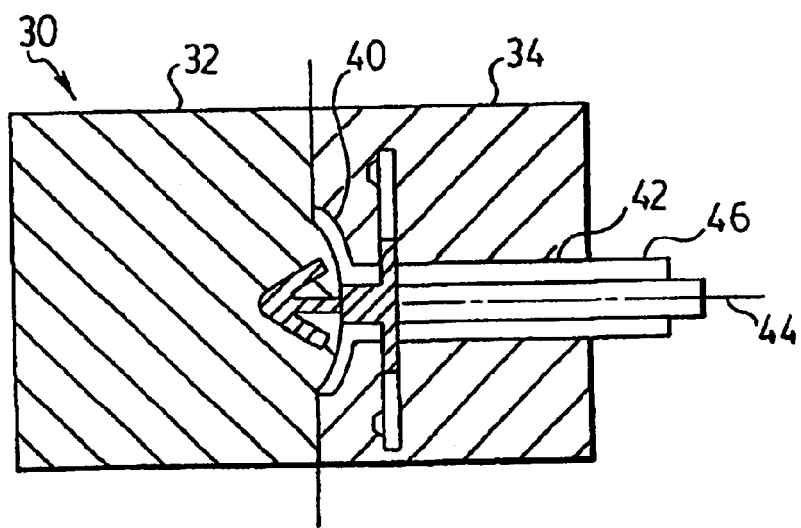
FIG. 5 is a section view of the mold of FIG. 4, molding the base portion of the W-Clip of FIG. 1.

Referring to FIGS. 4 and 5, a mold 30 for manufacturing the clip 10 is illustrated. The mold 30 comprises mold portions 32 and 34 and mirror mage mold portions (not illustrated). Optionally mold halves could be utilized. Mold portion 32 has a cavity 36 which is complementary to the body section 24 and tangs 16. Additionally, the surface 38 surrounding the entrance of cavity 36 is contoured to be complementary to the concave surface of the sealing flange 18.

Mold portion 34 has a cavity 40 complementary to the plate 12, the base 22 and the convex side of sealing flange 18. Mold portion 34 has a bore 42 which communicates with cavity 40. Optionally, mold portions 32, 34 can be made as a single mold half with a mirror image mold half. The parting line of the clip 10 is longitudinally of the base 12.

To mold a clip 10, the mold 30 is closed. An injector pin 44 has a sleeve 46. The pin 44 and sleeve 46 is inserted through bore 42 until pin 44 abuts with surface 38 and closes off cavity 36. Sleeve 46 is aligned with the inner edge of the mold cavity 40 defining plate 12. A first relatively softer or low durometer material, such as a synthetic rubber, ZYTEL FN or SANTOPRENE is injected into the cavity 40 surrounding the pin forming sealing flange 18. The injector pin 44 and sleeve 46 are retracted to the outer edge of cavity 40. A second relatively rigid or high durometer material, such a NYLON is injected into cavity 36 and the remainder of cavity 40 to form the plate 12, the stem 14 and the tangs 16. The mold 30 is opened and the clip 10 is ejected.

Figure 6:
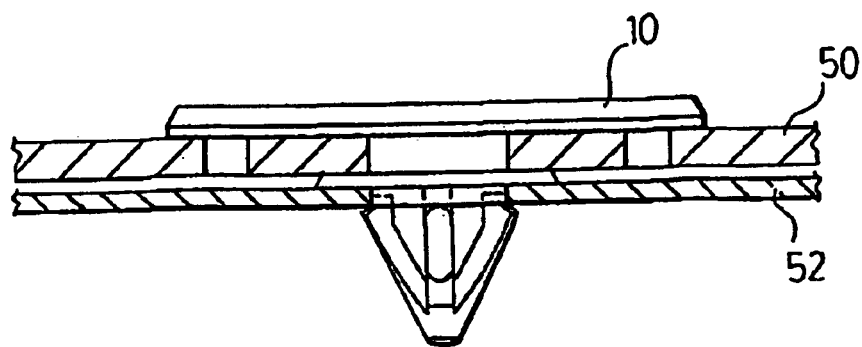
FIG. 6 is a side sectional view of the W-Clip of Figure fastening a plastic panel to a support structure.

Referring to FIG. 6, a clip 10 is illustrated fastening a plastic panel 50 to a support structure 52. The plastic panel 50 has an aperture sized to receive the base 22 of stem 14 and the support structure 52 has an aperture smaller than the diameter of the aperture of the plastic panel 50. The width of the base 22 prevents the clip 10 from being inserted into the support structure 52. The tangs 16 are biased and sized to enable insertion of the stem 14 through the aperture of support structure 52 until the tangs 16 snap into place when fully inserted. The bias of tangs 16 retain the tangs 16 in engagement with the back side of the support structure 52, i.e., the notches 26 prevent removal of the clip 10 from the support structure 52.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed:

1. A method of forming a clip having a plate, a stem extending from said plate, a pair of tangs extending from a distal end of the stem towards said plate, and a sealing flange extending from said body section of said stem adjacent said base, said stem having a base and a body section, said base having a width greater than a width of said body section, said method comprising steps of:

providing a mold having a cavity complementary to said clip, moving an injector pin to close off a portion of the cavity complementary to said stem, moving a sleeve surrounding said injector pin to a position to close a portion of the cavity defining said sealing flange, injecting a first material having a first durometer into said cavity to mold said sealing flange, retracting said injector pin and said sleeve to close said cavity at a position to define a portion of said plate;

injecting a second material having a second durometer into said cavity to mold said plate, stem and tangs;

opening said mold and ejecting said clip.

2. A method as claimed in claim 1 wherein said first material having a first durometer is a synthetic rubber and said second material having a second durometer is nylon.

3. An apparatus for molding a clip wherein the clip includes a plate, a stem extending from the plate, a pair of tangs extending from a distal end of the stem towards the plate, and a sealing flange extending from the stem, said apparatus comprising:

a mold having a first mold cavity complementary to said sealing flange and a second mold cavity complementary to said plate, stem and tangs, an injector pin communicating with said first and second mold cavity and a source of first material of a first durometer and a source of second material of a second durometer, said second durometer being greater than said first durometer, and a sleeve surrounding said injector pin and slidable relative thereto, said pin and sleeve each moveable between a first position closing said first mold cavity and a second position closing said second cavity.

4. An apparatus as claimed in claim 3 wherein said pin closes a portion of the second cavity corresponding to said stem and tangs when said pin is in said first position.

5. An apparatus as claimed in claim 4 wherein said first and second mold cavities have a common volume.

* * * * *